(No Model.)
J. M. PERRY.
FLY TRAP.
No. 339,685. Patented Apr. 13, 1886.
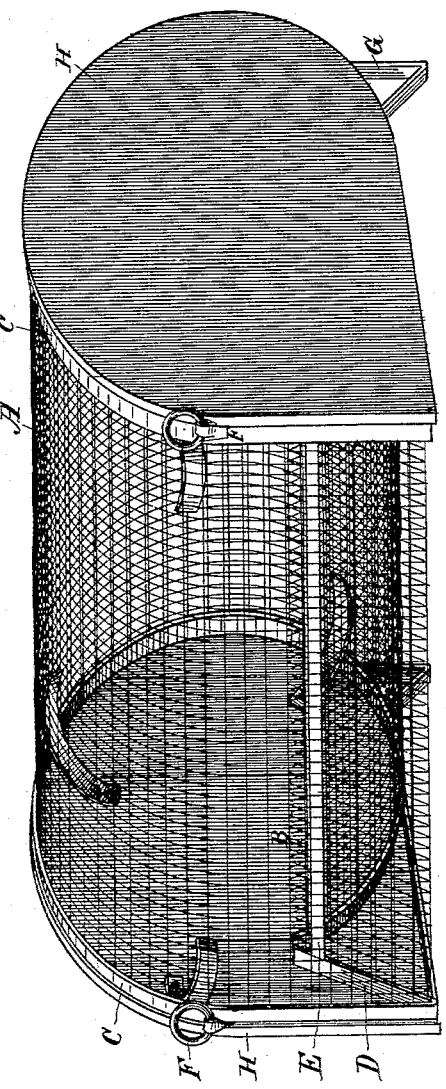
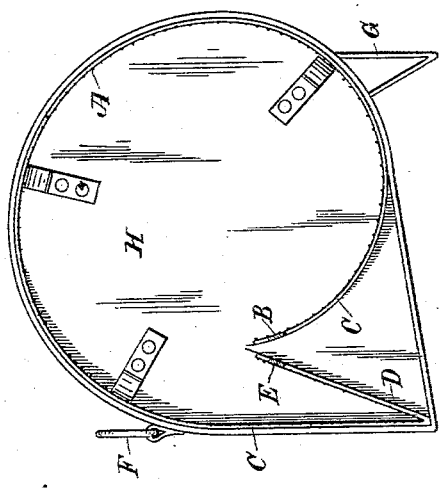

UNITED STATES PATENT OFFICE.

J. MONROE PERRY, OF OAKLAND, CALIFORNIA.

FLY-TRAP.

SPECIFICATION forming part of Letters Patent No. 339,685, dated April 13, 1886.

Application filed January 27, 1886. Serial No. 189,972. (No model.)

*To all whom it may concern:*

Be it known that I, J. MONROE PERRY, of Oakland, Alameda county, State of California, have invented an Improvement in Fly-Traps; and I hereby declare the following to be a full, clear, and exact description of the same.

My invention relates to a device for catching and containing flies; and it consists in the construction and combination of devices, which I will hereinafter describe and claim.

Referring to the accompanying drawings for a more complete explanation of my invention, Figure 1 is a view of the trap. Fig. 2 is a transverse section.

A is the wire-gauze casing, which is coiled, as shown, in a partially cylindrical or spiral form. The inner edge may be supported upon a strip of metal, B, which maintains it in a straight line. The ends of the netting are fixed in spirally-shaped metal or other supporting plates, as shown at C. These are continued beyond and outside of the inner edge and at some distance therefrom, as if commencing a spiral coil, and are carried a short distance beyond the inner edge, as shown, then folded back sharply, so as to make an acute angle, D. The outer edge is thus brought up parallel with the inner edges, being supported by a rigid strip, E, so that the inner edges, which are left ragged by the cutting of the wire-cloth, are brought near together, leaving a narrow space between them, as shown. The outer portions of the supporting end frames (and with them the screen which extends between them) are nearly flat, and may have hooks or eyes at F, by which the device can be hung against the wall or window. The device is also provided with legs, as shown at G, so that if it is to be set upon a window-seat, table, or other support, one side will rest upon these legs and the other upon the angular folded edge D, and the circular or curved lower portion of the trap will be raised a short distance from the table or support upon which it stands, so that flies may crawl beneath it.

This cylindrical trap may be made of any desired length, and is provided with end caps, H, which fit over the end of the frames, so as to inclose the interior space, and they have springs or other means for conveniently holding them in place.

The operation of the trap will then be as follows: It being a well-known fact that flies will seek the light, this device may be hung by the hooks before described upon a window, so that the flat side will be against the window, the cylindrical portion curving outward away from the window, and the narrow opening between the outer and inner edges is thus at the lower part, as shown. Flies crawling up the window will, upon reaching the inclined angular portion of the net-work, crawl up on it until they reach the opening between the two edges, and will then pass through this opening, where they will be retained, as they do not usually attempt to crawl downward, and the opening is so narrow that they will rarely find it, so as to go out again. If set upon a table or other surface either in a clean condition or baited by means of some attractive substance, the flies will crawl along beneath the curved or cylindrical portion until they reach the acute angular bend, and will then crawl up on the inclined side and enter the trap between the edges, as before described. When the trap has become sufficiently filled, it is only necessary to remove one of the ends and discharge and destroy the contents.

I am aware it is not broadly new to construct a fly-trap the sides and top of which are composed of one piece of wire-cloth or perforated metal, and bent inwardly at the lower end to form a cone, with a narrow slit for the passage of the flies. I am also aware it is not broadly new to construct a removable cylinder of end pieces and wire-cloth body and interior fly-cone. I therefore do not claim such construction, broadly, as my invention.

Having thus described my invention, what I claim as new, and desire to secure by Letters Patent, is—

1. The spirally-curved rigid end pieces bent at an acute angle at the outer end, so as to bring the inner and outer edges in close proximity, and having legs fixed to the curved portion, in combination with the sheet of wire-netting bent to a similar curve, having its ends secured within these end pieces and its adjacent inner and outer edges secured to and supported by rigid parallel bars extending between the curved end supports, substantially as herein described.

2. The spirally-curved wire-net casing having the rigid end piece bent at an acute angle and the edge supports, in combination with the removable end caps with their spring-fastening, substantially as herein described.

3. The spirally-curved net-casing with its rigid end and adjacent edge supports, having the removable end caps, as shown, in combination with the eyes or hooks secured to the flat side of the casing and by which it may be suspended, substantially as herein described.

In witness whereof I have hereunto set my hand.

J. MONROE PERRY.

Witnesses:
C. K. MARSHALL,
CHAS. L. KING.